United States Patent [19]

Tulai

[11] Patent Number: 5,661,759
[45] Date of Patent: Aug. 26, 1997

[54] DIGITAL FSK RECEIVER USING DOUBLE ZERO-CROSSING

[75] Inventor: Alexander F. Tulai, Nepean, Canada

[73] Assignee: Mitel Corporation, Kanata, Canada

[21] Appl. No.: 577,777

[22] Filed: Dec. 22, 1995

Related U.S. Application Data

[63] Continuation of Ser. No. 433,148, May 3, 1995, abandoned, which is a continuation of Ser. No. 199,083, Feb. 22, 1994, abandoned.

[51] Int. Cl.$^6$ .................................................. H04L 27/14
[52] U.S. Cl. ................................................. 375/334; 395/2.22
[58] Field of Search ............................ 375/272, 278, 375/334, 337, 355; 329/300; 395/2.22

[56] References Cited

U.S. PATENT DOCUMENTS

| | | | |
|---|---|---|---|
| 4,466,106 | 8/1984 | Serrano | 375/334 X |
| 4,517,519 | 5/1985 | Mukaiyama | 375/334 X |
| 4,551,846 | 11/1985 | Takeda et al. | 375/334 X |
| 4,633,488 | 12/1986 | Shaw | 375/359 X |
| 5,103,463 | 4/1992 | Schoeneberg | 375/278 |
| 5,164,965 | 11/1992 | Karaali | 375/359 X |
| 5,311,556 | 5/1994 | Baker | 375/334 |

FOREIGN PATENT DOCUMENTS

| | | |
|---|---|---|
| 0 529 986 A2 | 3/1993 | European Pat. Off. . |
| 2102223 | 1/1983 | United Kingdom . |
| 2267417 | 12/1993 | United Kingdom . |

Primary Examiner—Young T. Tse
Attorney, Agent, or Firm—Charles E. Wands

[57] ABSTRACT

The present invention relates to a digital frequency shift keyed (FSK) signal receiver comprised of a band-pass filter having passbands corresponding to each modulation frequency of an FSK signal, for receiving and translating the FSK signal, a first zero crossing detector for receiving the translated signal and for generating a value signal having a higher or lower value during a 1 logic bit of the translated signal, and an opposite lower or higher value during a 0 logic bit of the translated signal, a second zero crossing detector for receiving the value signal and for outputting groups of 1's and groups of 0's, the group lengths depending on intervals between the higher and lower values.

10 Claims, 2 Drawing Sheets

DIGITAL FSK RECEIVER USING DOUBLE ZERO-CROSSING

This is a continuation of application Ser. No. 08/433,148, filed May 3, 1995—abandoned, which is a continuation of application Ser. No. 08/199,083, filed Feb. 22, 1994—abandoned.

FIELD OF THE INVENTION

This invention relates to data transmission, and in particular to a digital receiver for receiving frequency shift key (FSK) modulated data, such as is often transmitted at a 1200 baud rate in a telephone transmission system.

BACKGROUND TO THE INVENTION

FSK is a method used for data modulation, which has a logical 1 (a mark) designated by a carrier signal modulated by a low frequency $f_L$, and a logical 0 (a space) designated by the carrier signal modulated by a higher frequency $f_H$. In North America the lower frequency signal has been standardized for telephony at 1200+/−12 Hz, and the higher frequency signal at 2200+/−22 Hz.

While being carried over telephone trunks, the signal at the higher frequency suffers from attenuation that is different from and is usually higher than that of the signal at the lower frequency. This results in an imbalance between the levels of the signals at the lower and higher frequencies. This imbalance is called "twist", and is observed at the input of an FSK receiver. It is imperative that an FSK receiver copes well with signals suffering from twist as severe as e.g. 6 dB. FSK receivers typically utilize baud clock recovery circuits and AGC circuits to deal with the deleterious effects of twist.

SUMMARY OF THE INVENTION

The present invention is an FSK receiver and method of receiving an FSK signal which is extremely simple, requires no clock recovery, and requires no AGC circuits, while receiving and indicating the bits of an FSK signal which may or may not exhibit twist. The invention samples the incoming FSK signal, and applies the signal through two successive zero crossing detectors. The first detector establishes the time intervals between zero crossings of the modulations of the FSK signal thus establishing the existence of ones or zeros based on the frequencies of the FSK signal. The second detector establishes the time intervals of groups of 1's and 0's, thus establishing how many 1's or 0's are grouped together, since the time intervals are related to the number of 1's or 0's that exist in the group. This allows a decoder, not part of this invention, which receives the output signal of the present invention to decode the signal.

In accordance with an embodiment of the invention, a digital frequency shift keyed (FSK) signal receiver is comprised of a band-pass filter having passbands corresponding to each modulation of an FSK signal for receiving and translating the FSK signal, a first zero crossing detector for receiving the translated signal and for generating a value signal having a higher or lower value than zero during a 1 logic bit of the translated signal, and an opposite lower or higher value during a 0 logic bit of the translated signal, and a second zero crossing detector for receiving the value signal and for outputting groups of 1's and groups of 0's, the group lengths depending on the intervals between the higher and lower values. In a successful embodiment the higher value signal represented 1's and the lower value signal represented 0's.

In accordance with another embodiment a method of receiving an FSK signal is comprised of sampling an incoming FSK signal with a large number of samples per bit, generating a sequence of numbers representing the time intervals between zero crossings of each frequency of the FSK signal, biasing the numbers so that they vary approximately equal amounts about a zero base value, determining the time intervals between zero base value crossings of the biased numbers, and indicating numbers of 1's and 0's in the time intervals depending on the polarities of said biased numbers relative to the zero base value.

BRIEF INTRODUCTION TO THE DRAWINGS

A better understanding of the invention will be obtained by a consideration of the detailed description below, in conjunction with the following drawings, in which.

DESCRIPTION OF THE PREFERRED EMBODIMENT

Figure 1:
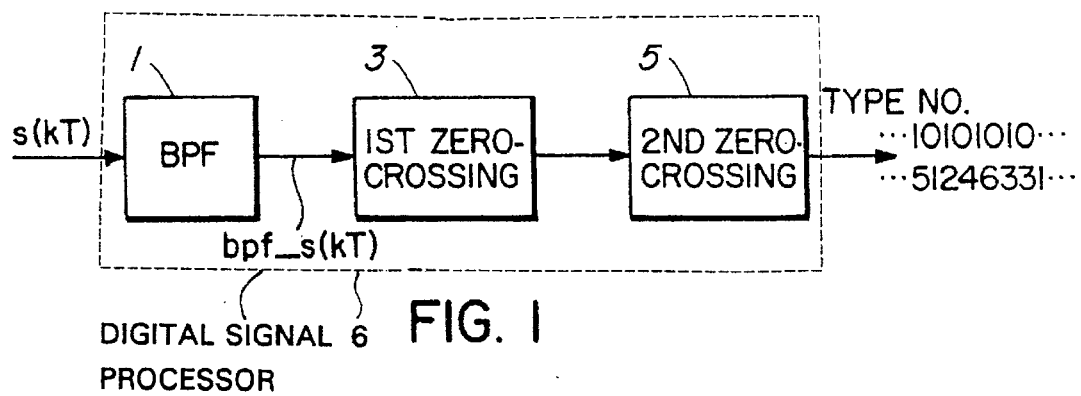
FIG. 1 is a block schematic of an embodiment of the present invention.

Turning to FIG. 1, an FSK input signal s(kT) is received at a bandpass filter 1, and after translation therein, its output signal bpf_s(kT) is applied to a first zero crossing detector 3. The output signal of detector 3 is applied to the input of a second zero crossing detector 5. The output of detector 5 is a signal which indicates how many 1's and 0's are contained in each of successive groups of bits. The invention can be implemented in a digital signal processor 6, which in a successful embodiment could extract data from an FSK signal at a rate of about 8 kHz for presentation to the input of filter 1.

Linear input samples of the FSK input signal are bandpass filtered in filter 1 which in the present example does an upsampling to increase the sampling rate to 24 kHz, resulting in 20 samples per incoming bit, while limiting the frequency to ($f_L$−100, $f_H$+100) Hz. An inexpensive CODEC could be used (not shown), to convert the analog input signal to companded 8 bit values that could be further expanded in hardware or software to linear values with one sign bit and 12 bits for magnitude, (e.g. for European standards) or with one sign bit and 13 bits for magnitude (e.g. for North America).

Figure 2:
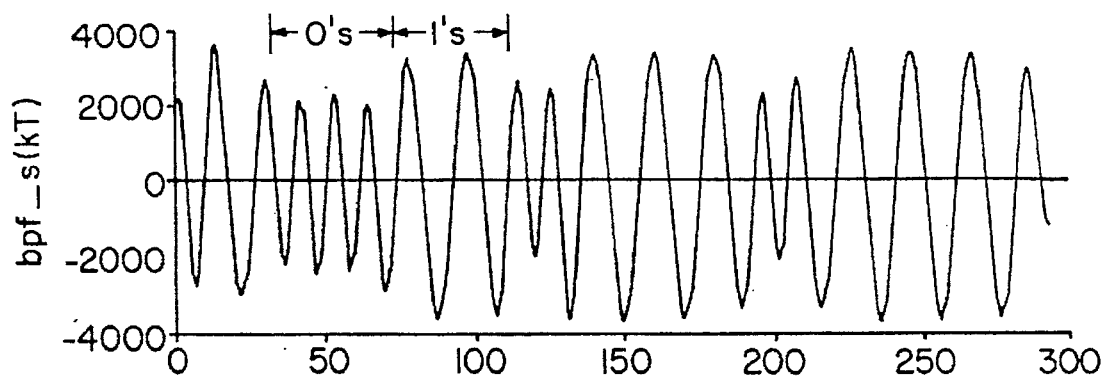
FIG. 2 is a graph illustrating the output signal of a bandpass filter used in an embodiment of the present invention.

The output signal of the bandpass filter is similar to that shown in FIG. 2. A high frequency interval, designating a series of 0's, is shown as $0_s$, and a low frequency interval, designating a series of 1's, is shown as $1_s$. A significant difference in amplitudes may be seen between the signals of the two frequencies, caused by twist. The signal used to obtain the plot that is shown had a twist of 4 dB (the ratio of the amplitudes of the two frequency signals), and no discernible noise. The filtered sample numbers are shown on the x axis.

The filtered signal bpf_s(kT) enters the first zero crossing detector 3. Detector 3 produces a sequence of numbers representing a numerical equivalent of the time interval between two consecutive zero crossings.

Figure 3:
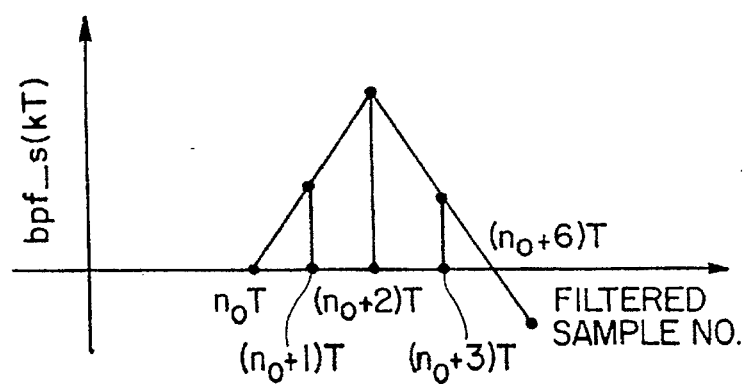
FIG. 3 is a graph illustrating the time intervals of samples taken of an input signal to a first zero crossing detector.

As an example, assume that at time $n_oT$ the filtered sample bpf_s(noT)=0, and that the next consecutive filtered samples are as shown in FIG. 3 wherein $n_o$ is a filtered sample number and T is a time increment. At instant $n_oT$ zero crossing detector 3 is initialized, by initializing a counter. At subsequent instants:

At $(n_o+1)T$, the counter should be incremented by L

At $(n_o+2)T$, the counter should be incremented by L

At $(n_o+3)T$, the counter should be incremented by L

At $(n_o+4)T$, the counter should be incremented by $$L \cdot (|bpf\_s((n_o+3)T|/(|bpf\_s((n_o+3)T|+|bpf\_s((n_o+4)T|),$$

Then the counter value is saved, and the counter is initialized to $$L \cdot (|bpf\_s((n_o+4)T|/(|bpf\_s((n_o+3)T|+|bpf\_s((n_o+4)T|)$$

where

|x| is the absolute value of the function contained within the absolute value bars, and L is a numerical constant.

The process continues as described above. However, whenever the current sample has the same sign as the previous sample (or if one of the values is zero), the counter is incremented by L. When the current sample has a different sign from the previous sample, a zero crossing has occurred and the counter is incremented by a fraction of L, calculated as shown at time $(n_o+4)$ above. This zero crossing process was possible because the filtered signal was oscillating about a zero baseline.

Figure 4:
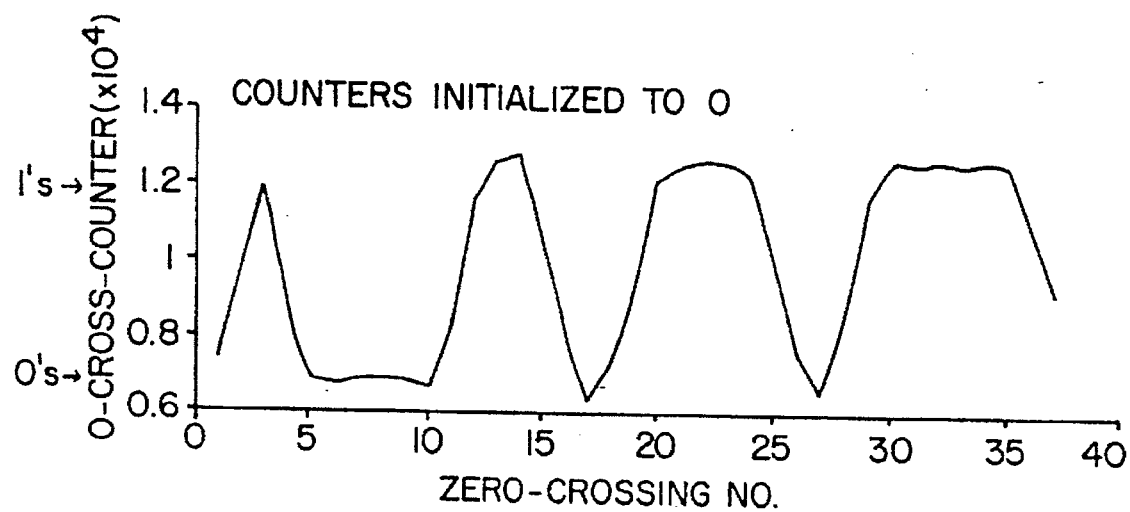
FIG. 4 is a graph illustrating a signal at an output of the first zero crossing detector.

A plot of the output signal values of zero crossing counter 3 is shown in FIG. 4, against zero crossing number occurrence. The maximum values shown correspond to input signal codings of 1's, and the minimum values correspond to input signal codings of 0's.

It will be noticed that the entire graph is in a positive value range; the width of each peak (either of the maximum or minimum values) are given by the number of bits that modulate the signal carrier.

Figure 5:
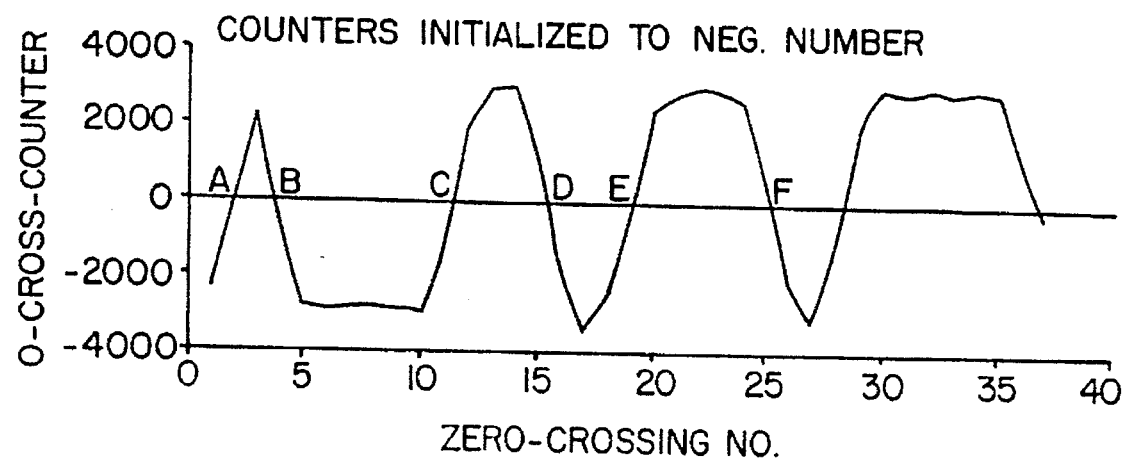
FIG. 5 is a graph illustrating a signal at the output of the first zero crossing detector after biasing.

The entire signal shown in FIG. 3 is then biased by a simple translation, into a range which is approximately equal on either side of a zero base line. The translation can be achieved by always initializing the counter used by the first zero crossing detector to a large enough negative value (e.g. $-10^4$ in the example of FIG. 3). Using this procedure the same sequence, after translation, appears as shown in FIG. 5. That biased sequence is applied to a second zero crossing detector 5.

It should be noted that the lengths of segments AB, BC, CD, etc. shown in FIG. 5 are proportional to the number of bits 1, bits 0, bits 1, etc., modulated by the input FSK signal, occurring in sequence groups. The same method as noted above, of incrementing the counter 5 with a fixed value $L_2$ or a fractional value of $L_2$ (when zero crossing occurs) allows calculation of approximate values for the segments AB, BC, CD, etc.

If a segment is generically defined as being between two consecutive zero crossings defining 1's with x+, and for a segment defining 0's with x−, the number of 1's and 0's is generally given by the equations:

no. of 1's=round(x+/k+)

no. of 0's=round(x−/k−)

The constants k+ and k− are experimentally determined and they are a function of the constant L2 used by the zero crossing detector 5. In a laboratory prototype it was found that good timing was obtained when $$(k+/k-) \equiv (f_L/f_H)$$

At the output of the zero crossing detector 5, groups of 0's and 1's are indicated, rather than 1 bit at a time. Thus the output signal of the FSK receiver is asynchronous, rather than synchronous; an application in which an asynchronous output is utilized is in a CLASS receiver.

It should be noted that this FSK receiver and method invention is extremely simple, and provides the required output signal without requiring an automatic gain control (AGC), or baud clock recovery. Accordingly, the cost is significantly lower than circuits that require AGC or baud clock recovery.

A person understanding this invention may now design variations or improvements using the principles described herein. All such variations or improvements falling within the ambit of the claims appended hereto are considered to be part of the present invention.

I claim:

1. A digital frequency shift keyed (FSK) signal receiver comprising:
    a) a band-pass filter having passbands corresponding to each modulation frequency of an FSK signal, for receiving and translating the FSK signal,
    b) a first zero crossing detector for receiving the translated signal and for generating a value signal having a higher or lower value during a 1 logic bit of the translated signal, and a different lower or higher value during a 0 logic bit of the translated signal, and
    c) a second zero crossing detector for receiving said value signal and for outputting groups of 1's and groups of 0's in group lengths depending on intervals between the higher and lower values.

2. A receiver as defined in claim 1 including means for biasing said value signal so as to vary approximately equal amounts about a zero base value and creating opposite polarity values, the second zero crossing detector being comprised of, in a digital signal processor a first counter means and means for continuously incrementing the counter means using a fixed value representing intervals of said value signal between zero crossings of said zero base value, each total count of said value signal between zero crossings of said zero base value being approximately the number of 0's or 1's between said zero crossings in a group.

3. A receiver as defined in claim 2, in which said fixed value is comprised of an integer, a fraction of said integer incrementing said counter means and a remaining fraction of said integer initializing said counter means for a new interval.

4. A receiver as defined in claim 2 in which the number of 1's in a group is equal to round(x+/k+), and the number of 0's in a group is equal to round(x−/k−), where x+ is the counter means value between zero crossings of the value signal of one polarity, x− is the counter means value between zero crossings of the value signal of the other polarity, k+ and k− are constants which are a function of the fixed value incrementing the counter means.

5. A receiver as defined in claim 4 wherein $$(k+/k-) \equiv (f_L/f_H)$$

wherein $f_L$ is a lower modulation frequency component of the FSK signal, and $f_H$ is a higher modulation frequency component of the FSK signal.

6. A receiver as defined in claim 5, in which the FSK signal is at about a 1200 baud rate, in which the respective modulation frequencies are at approximately 1200 and 2400 Hz representing 1's and 0's respectively, and in which the sampling rate is about 24 kHz resulting in about 20 samples per bit.

7. A receiver as defined in claim 5 including means in said band-pass filter for providing a large number of samples per bit of said FSK signal, and for passing said frequency components $f_L$ and $f_H$ while attenuating frequency components out of a predetermined range.

8. A receiver as defined in claim 7 in which said predetermined range is $(f_L-100)$ to $(f_L+100)$.

9. A receiver as defined in claim 2 wherein the first zero crossing detector is comprised of a second counter means for receiving samples of the translated signal, means for incrementing the second counter means with a numerical constant whenever a sample has the same polarity as a previous sample and by a fraction of said constant when a zero crossing of said translated signal has occurred, and for providing said value signal representing an interval of 1's or 0's, and for initializing said second counter means to zero or to a fraction of a count between zero crossings of said translated signal by the first counter means.

10. A method of receiving a frequency shift keyed (FSK) signal comprising:

a) sampling an incoming FSK signal with a large number of samples per bit b) generating a sequence of numbers representing the time intervals between zero crossings of each frequency of said FSK signal, c) biasing said numbers so that they vary approximately equal amounts about a zero base value, d) determining the time intervals between zero base value crossings of the biased numbers, and e) indicating numbers of 1's and 0's in the time intervals depending on the polarities of said biased numbers relative to said zero base value.

\* \* \* \* \*